(12) United States Patent
Orazem

(10) Patent No.: US 9,278,645 B1
(45) Date of Patent: Mar. 8, 2016

(54) METHOD AND APPARATUS FOR INSTALLING AND OPERATING AN AUXILIARY LIGHTING SYSTEM USING A TRAILER PLUG

(71) Applicant: Meyer Products, LLC, Cleveland, OH (US)

(72) Inventor: Louis Orazem, Chardon, OH (US)

(73) Assignee: Meyer Products, LLC, Cleveland, OH (US)

( * ) Notice: Subject to any disclaimer, the term of this patent is extended or adjusted under 35 U.S.C. 154(b) by 0 days.

(21) Appl. No.: 14/809,390

(22) Filed: Jul. 27, 2015

Related U.S. Application Data

(60) Division of application No. 14/680,367, filed on Apr. 7, 2015, which is a continuation-in-part of application No. 14/622,211, filed on Feb. 13, 2015.

(60) Provisional application No. 62/104,570, filed on Jan. 16, 2015.

(51) Int. Cl.
*B60Q 1/26* (2006.01)
*B60Q 1/28* (2006.01)
*B60Q 1/18* (2006.01)
*B60Q 1/34* (2006.01)
*B60Q 1/30* (2006.01)
*B60Q 1/44* (2006.01)
*H05B 37/02* (2006.01)

(52) U.S. Cl.
CPC ............. *B60Q 1/2661* (2013.01); *B60Q 1/18* (2013.01); *B60Q 1/28* (2013.01); *B60Q 1/305* (2013.01); *B60Q 1/34* (2013.01); *B60Q 1/44* (2013.01); *H05B 37/0209* (2013.01)

(58) Field of Classification Search
CPC .......... B60Q 1/2661; B60Q 1/28; B60Q 1/18; B60Q 1/34; B60Q 1/305; B60Q 1/44; H05B 37/0209
USPC .......................................... 362/485, 505, 506
See application file for complete search history.

(56) References Cited

U.S. PATENT DOCUMENTS

| | | |
|---|---|---|
| 4,781,393 A | 11/1988 | Jeter |
| 5,420,480 A | 5/1995 | Knepel et al. |
| 5,524,368 A | 6/1996 | Struck et al. |
| 5,904,261 A | 5/1999 | Belinky et al. |
| 6,005,300 A | 12/1999 | Kelly |
| 6,112,139 A | 8/2000 | Schubert et al. |
| 6,265,829 B1 | 7/2001 | Perdec |
| 6,322,238 B1 | 11/2001 | Barr |
| 6,396,210 B1 | 5/2002 | Menze |
| 6,504,306 B2 | 1/2003 | Menze |
| 6,700,310 B2 | 3/2004 | Maue et al. |
| RE38,665 E | 12/2004 | Struck et al. |
| 7,137,724 B2 | 11/2006 | Menze et al. |
| 7,224,262 B2 | 5/2007 | Simon et al. |
| 7,279,640 B2 | 10/2007 | White et al. |
| 7,341,264 B2 | 3/2008 | Swannie |

(Continued)

*Primary Examiner* — Laura Tso
(74) *Attorney, Agent, or Firm* — Emerson Thomson Bennett; Roger D. Emerson; Timothy D. Bennett

(57) ABSTRACT

An auxiliary lighting system using a trailer plug is disclosed. A signal may be transmitted from a vehicle's trailer plug to an auxiliary implement, such as a snowplow assembly. In one embodiment, the auxiliary implement may be attached to the front of the vehicle. The signal can be sent through a wire bundle. With this invention, the auxiliary lighting system does not require rewiring of the vehicle's wiring harness.

20 Claims, 12 Drawing Sheets

(56) References Cited

U.S. PATENT DOCUMENTS

| | | | |
|---|---|---|---|
| 7,400,058 B1 * | 7/2008 | Wayne | B60Q 1/143 307/9.1 |
| 7,463,136 B2 | 12/2008 | Ungerman | |
| 7,557,699 B2 | 7/2009 | Walton | |
| 7,661,210 B2 | 2/2010 | Shepherd | |
| 7,973,651 B2 | 7/2011 | Stiles et al. | |
| 8,061,879 B2 | 11/2011 | Simmons et al. | |
| 8,068,961 B2 | 11/2011 | Menze | |
| 8,185,276 B2 | 5/2012 | Buckbee et al. | |
| 8,203,445 B2 | 6/2012 | Recker et al. | |
| 8,552,852 B1 * | 10/2013 | Hertz | B60P 3/40 340/468 |
| 2008/0073090 A1 | 3/2008 | Harris | |
| 2012/0134389 A1 | 5/2012 | Pahlavan et al. | |
| 2014/0052335 A1 | 2/2014 | Moon, Jr. et al. | |

* cited by examiner

METHOD AND APPARATUS FOR INSTALLING AND OPERATING AN AUXILIARY LIGHTING SYSTEM USING A TRAILER PLUG

This application is a divisional of U.S. patent application Ser. No. 14/680,367 filed Apr. 7, 2015, which is a continuation-in-part (CIP) of U.S. patent application Ser. No. 14/622,211, filed Feb. 13, 2015, which claims priority to U.S. Provisional Patent Application No. 62/104,570, filed Jan. 16, 2015, the contents of which are incorporated herein by reference.

TECHNICAL FIELD

This invention relates to a method for installing and operating an auxiliary lighting system using a vehicle's trailer plug.

BACKGROUND

When an auxiliary implement, such as a snowplow, is mounted onto the front of a vehicle, the vehicle's headlights and turn signals are commonly obscured. Therefore, vehicle-mounted auxiliary implements often include an auxiliary lighting system which includes auxiliary headlights and turn signals which operate instead of (or in addition to) the vehicle's headlights and turn signals.

Such auxiliary lighting systems typically require numerous connections to the vehicle's electronic lighting system so that the auxiliary headlights and turn signals can be coordinated, powered, and controlled by the vehicle's existing electrical system. Current installation techniques involve disconnecting the vehicle's original equipment manufacturer's ("OEM") wiring harness and splicing or otherwise connecting the new wiring harness for the auxiliary lighting to the OEM wiring. This part of the process is labor intensive and objectionable as it requires altering the vehicle's existing electrical system. For example, the time necessary to initially install and mount a snowplow that utilizes an auxiliary lighting system to a vehicle is approximately four hours. The process of installing the wiring harness consumes approximately two and one half hours of that time. Therefore, a simpler installation process would reduce the amount of time and effort necessary to install an auxiliary implement utilizing an auxiliary lighting system and would eliminate the need for major alterations to the vehicle's OEM electrical systems.

Many vehicles that are suited to operate an auxiliary implement, such as a snowplow or spreader, are trucks or other vehicles that include trailer hitches that include a hitch receiver and a trailer plug. It is believed that approximately 95% of trucks currently manufactured feature trailer hitches. More recently, manufacturers offer trucks with towing packages, including a hitch receiver and a trailer plug, installed as standard equipment. Trucks that do not include these features as standard equipment from the manufacturer have the towing package available as an option from the factory. Vehicles other than trucks, such as cars and all-terrain vehicles (also known as "ATV's") may also offer such hitch receivers and trailer plugs and may also be candidates for embodiments of this invention.

"Trailer plugs" are a type of electric connector typically positioned at the rear end of vehicles, such as a pickup truck, usually near a hitch receiver. Each trailer plug is positioned at one end of a trailer wiring harness. Trailer plugs come in multiple varieties and are designed to power and control trailer features such as brake lights, turn signals, running lights, and the like. The two most common trailer plugs are the 7-way plug and the 4-way plug. Many trucks now come with the 7-way plug installed from the factory, as discussed above. Other common plugs include a 6-way, a 5-way, and a 4-way plug. There are also a wide variety of European type trailer plugs with different wiring configurations than those just described.

SUMMARY

According to some embodiments of this invention, an auxiliary apparatus may be used with an associated vehicle having a front, first and second sides, a back, and a trailer plug positioned at the back of the associated vehicle. The auxiliary apparatus may comprise: (A) an auxiliary implement that is removably mountable to at least one of: (1) the associated vehicle's front; and, (2) at least one of the associated vehicle's sides; (B) an auxiliary lighting system for use with the auxiliary implement including at least one auxiliary light; and, (C) a wire bundle that: (1) has a first end that is electrically hardwire connectable to the trailer plug; (2) has a second end that is electrically hardwire connectable to at least one of the auxiliary lighting system and a controller; and, (3) transmits an electrical signal from the trailer plug to the second end. The controller: (1) is electrically connectable to at least one of the wire bundle and the auxiliary lighting system; and, (2) comprises a microprocessor programmed to operate the at least one auxiliary light based directly or indirectly on the electrical signal.

According to other embodiments of this invention, an auxiliary lighting system method for use with an associated vehicle having a front, first and second sides, a back, and a trailer plug positioned at the back of the associated vehicle, may comprise the steps of: (A) providing an auxiliary implement; (B) providing an auxiliary lighting system for use with the auxiliary implement that includes at least one auxiliary light; (C) providing a wire bundle; (D) providing a controller comprising a microprocessor; and, (E) designing the auxiliary implement, the wire bundle and the controller to be operable according to the following steps: (1) mounting the auxiliary implement to at least one of: (a) the associated vehicle's front; and, (b) at least one of the associated vehicle's sides; (2) mounting the auxiliary lighting system to at least one of the associated vehicle and the auxiliary implement; (3) mounting the controller to at least one of: (a) the associated vehicle's front; (b) at least one of the associated vehicle's sides; (c) the auxiliary implement; and, (d) the auxiliary lighting system; (4) electrically hardwire connecting a first end of the wire bundle to the trailer plug; (5) electrically hardwire connecting a second end of the wire bundle to at least one of the auxiliary lighting system and the controller; (6) electrically connecting the controller to at least one of the wire bundle and the auxiliary lighting system; (7) transmitting an electrical signal from the trailer plug through the wire bundle to the second end of the wire bundle; and, (8) using the controller to operate the at least one auxiliary light based directly or indirectly on the electrical signal.

According to still other embodiments of this invention, an auxiliary lighting system may be used with: (1) an associated vehicle having a front, first and second sides, a back, and a trailer plug positioned at the back of the associated vehicle; and, (2) an associated auxiliary snowplow assembly mountable to the associated vehicle and comprising a plow blade positioned substantially at the front of the associated vehicle. The auxiliary lighting system may comprise: (A) at least one auxiliary light; (B) a wire bundle that: (1) has a first end that is electrically hardwire connectable to the trailer plug; (2) has a second end that is electrically hardwire connectable to at least one of the auxiliary lighting system and a controller; and, (3) transmits an electrical signal from the trailer plug to the second end; and, (C) wherein the controller: (1) is electrically connectable to at least one of the wire bundle and the auxiliary lighting system; and, (2) comprises a microprocessor programmed to operate the at least one auxiliary light based directly or indirectly on the electrical signal.

Numerous benefits and advantages of this invention will become apparent to those skilled in the art to which it pertains upon reading and understanding of the following detailed specification.

DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 1:
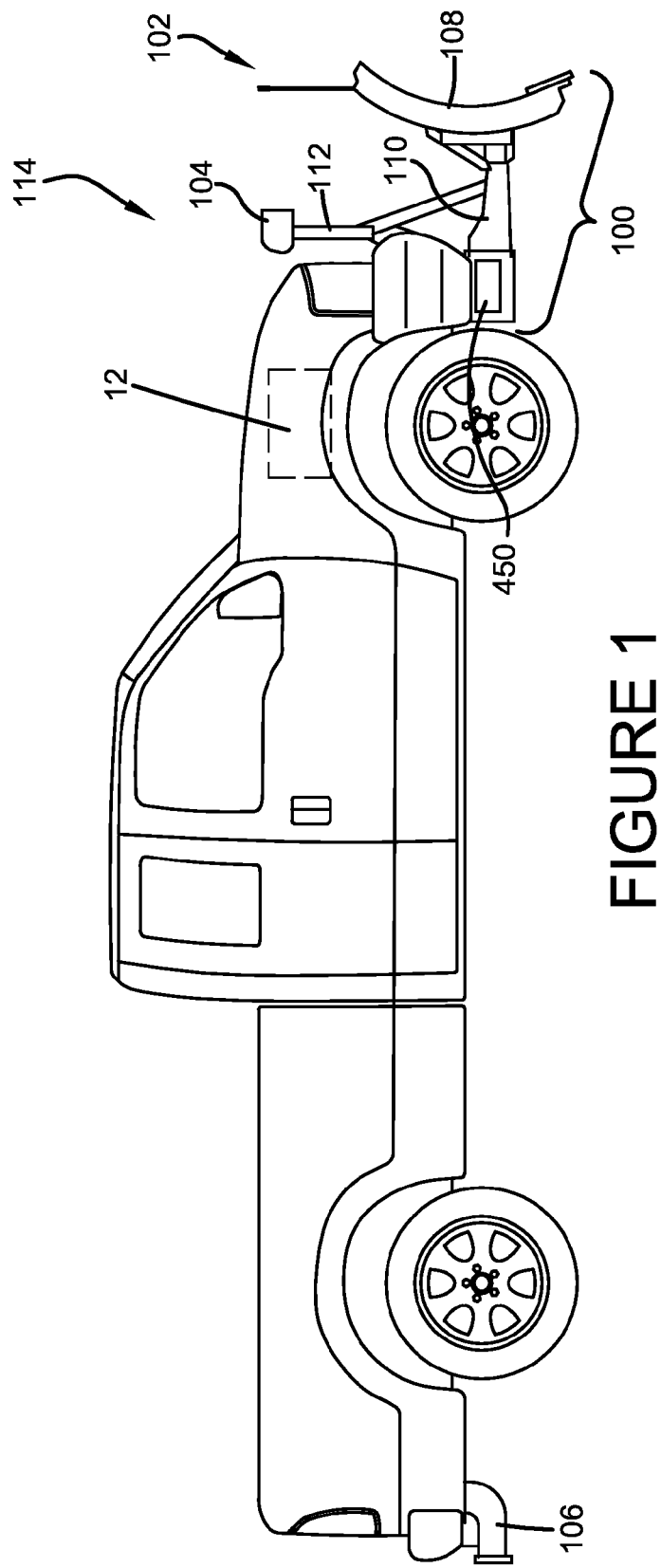
FIG. 1 is a side view of a vehicle with a snowplow implement and trailer plug.
Figure 1A:
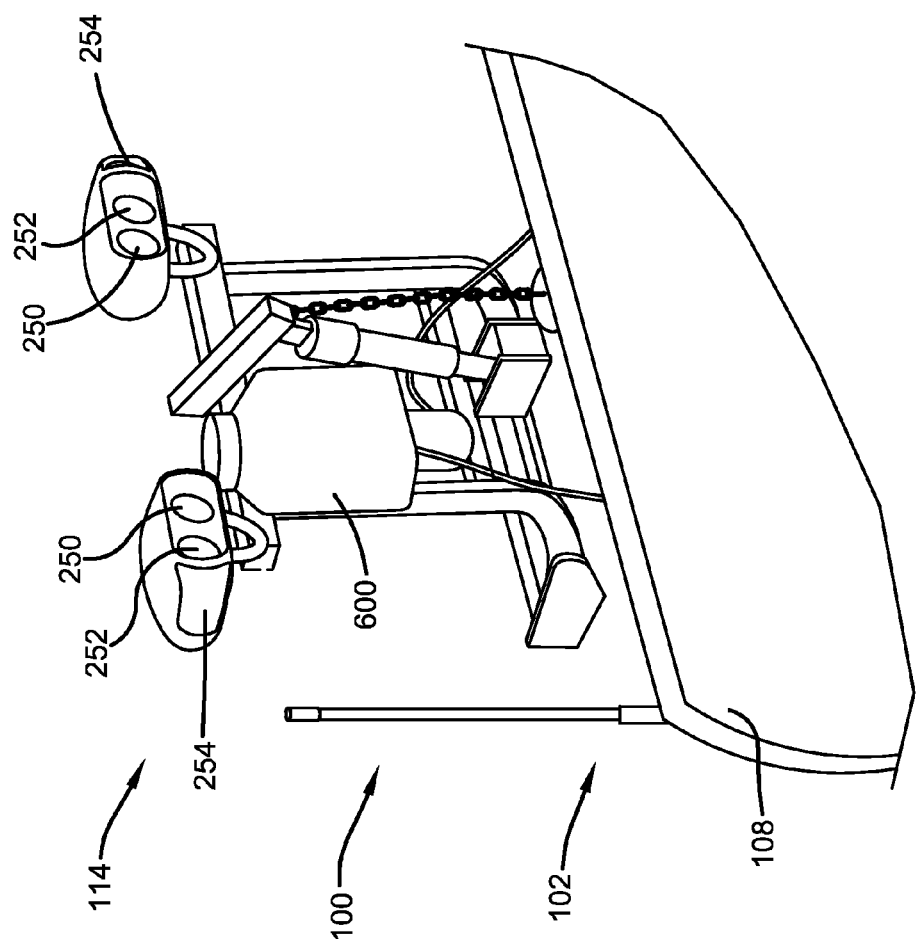
FIG. 1A is a front perspective view of a snowplow implement.

With reference to FIG. 1, an auxiliary lighting system 114 having at least one auxiliary light 104 is shown installed on the front end of a vehicle having a trailer hitch 106 at its rear end. For the embodiment shown, the auxiliary lighting system 114 is part of an auxiliary implement 100 that is a snowplow assembly 102. This invention, however, may be used with any auxiliary lighting system chosen with the sound judgment of a person of skill in the art. FIG. 1A shows an auxiliary lighting system 114 including the following auxiliary lights: right and left blinker lights 254, 254, right and left head lights 250, 250 and right and left high beam lights 252, 252. In other embodiments, the auxiliary implement 100 can be a vehicle-mounted device that uses or requires auxiliary lighting. Non-limiting examples of other snow and/or ice removal auxiliary implements that may be used with this invention include power brooms, sweepers, spreaders and the like. While the auxiliary implements 100, 100 shown may be mounted to the front of the vehicle, in other embodiments of the invention the auxiliary implement 100 can be mounted to the rear or sides of the associated vehicle, or a combination of the front, rear, and/or sides of the vehicle. For purposes of the remainder of this disclosure, the auxiliary implement 100 will be discussed as a snowplow assembly 102; however, all further embodiments disclosed are intended to be applicable to all embodiments as discussed above—including, where applicable, non-snow and/or ice removal auxiliary implements. As used herein, snowplow assembly 102 is interpreted to include the plow blade 108, the plow frame 110, the lift frame 112, and all parts associated therewith as is well known to those of skill in the art. The trailer hitch 106, when used, can include factory-installed or aftermarket hitches, without limitation.

Figure 2:
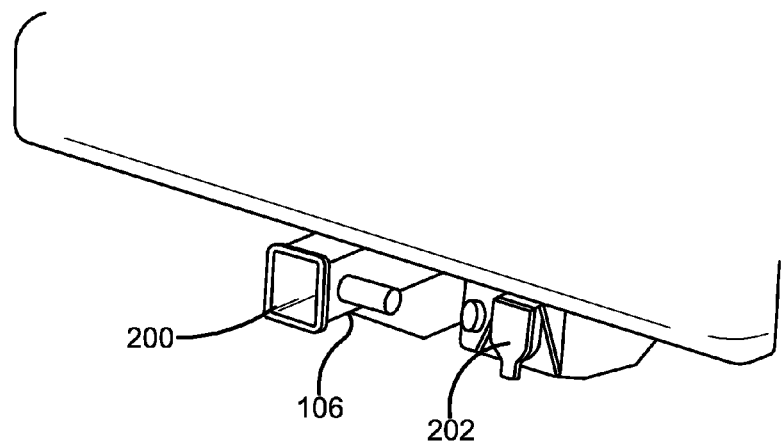
FIG. 2 is a view of an exemplary trailer hitch and trailer plug.

With reference now to FIG. 2, an embodiment of the trailer hitch 106 is shown including a hitch receiver 200 and a trailer plug 202. The hitch receiver 200, as is well known to those of skill in the art, is a tube adapted to receive a portion of a trailer or other device so that the trailer or other device can be physically attached to the vehicle. The trailer plug 202, as is well known to those of skill in the art, is an electric plug. While trailer plugs ordinarily come with hitch receivers, as shown, it should be understood that a hitch receiver is not required for this invention. Also, while trailer plugs ordinarily are positioned at the rear ends of vehicles, as shown, it should be understood that the location of the trailer plug when used with this invention can be any location chosen with the sound judgment of a person of skill in the art.

Figure 3A:
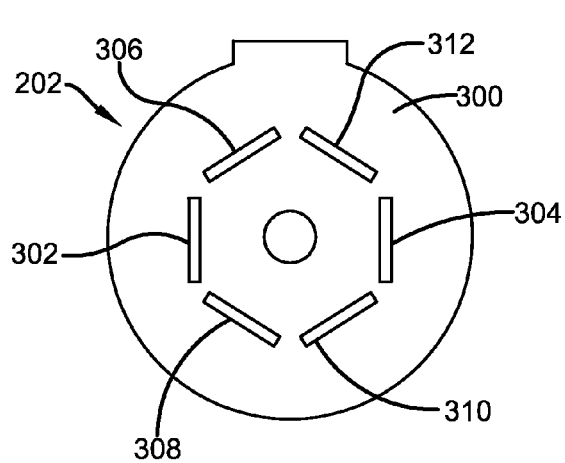
FIG. 3A is a close-up, end view of a 7-way plug.
Figure 3B:
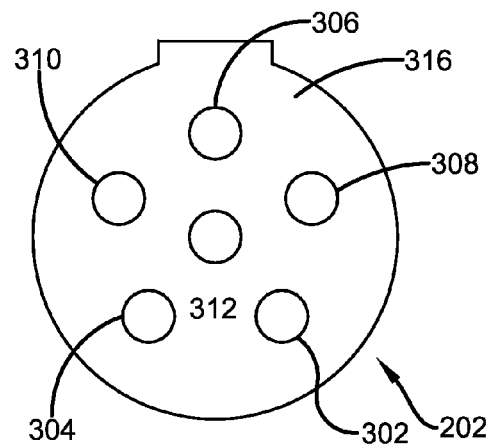
FIG. 3B is a close-up, end view of a 6-way plug.
Figure 3C:
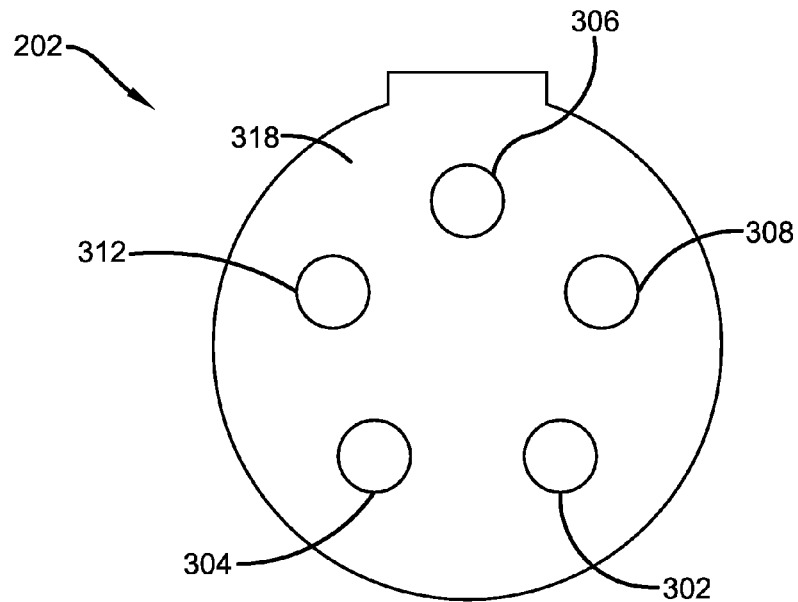
FIG. 3C is a close-up, end view of a 5-way plug.
Figure 3D:
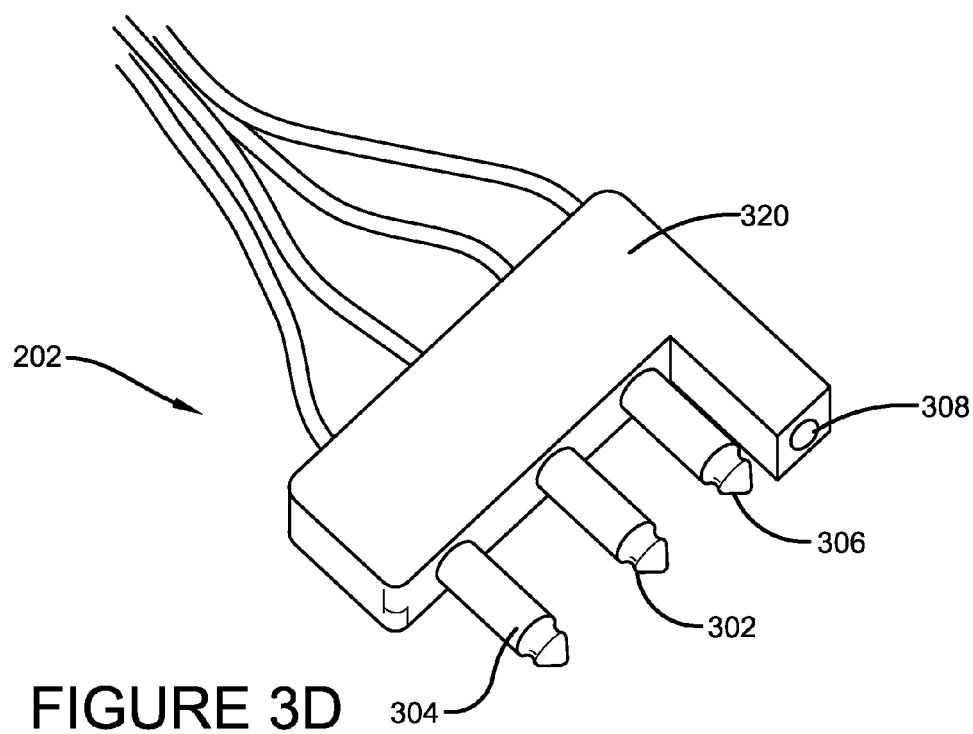
FIG. 3D is a close-up, perspective view of a 4-way plug.

As noted above, there are several types of trailer plugs. FIG. 3A illustrates a 7-way trailer plug; FIG. 3B illustrates a 6-way trailer plug; FIG. 3C illustrates a 5-way trailer plug; and, FIG. 3D illustrates a 4-way trailer plug. This invention may be used with any trailer plug chosen with the sound judgment of a person of skill in the art. The trailer plug 202 can be factory installed on the vehicle or it can be installed by an aftermarket or third party installer, without limitation. The trailer plug 202 can include a cover, as shown, but a cover is not required for this invention.

FIG. 3A illustrates a standard 7-way plug 300 that includes seven electrical connections with each of these connections providing power and/or control over some portion(s) of a trailer (not shown). One known set of connections are: (1) for a left turn signal 302 (also used for braking); (2) for a right turn signal 304 (also used for braking); (3) for tail lights 306 (also for marker lights); (4) a ground wire 308; (5) for trailer power brakes 310; (6) an auxiliary power connection 312; and (7) for reverse lights 314. FIG. 3B illustrates a 6-way plug 316 with these six connections: (1) for a left turn signal 302 (also used for braking); (2) for a right turn signal 304 (also used for braking); (3) for tail lights 306 (also for marker lights); (4) a ground wire 308; (5) for trailer power brakes 310; and, (6) an auxiliary power connection 312. FIG. 3C illustrates a 5-way plug 318 with these five connections: (1) for a left turn signal 302 (also used for braking); (2) for a right turn signal 304 (also used for braking); (3) for tail lights 306 (also for marker lights); (4) a ground wire 308; and, (5) for trailer power brakes 310. FIG. 3D illustrates a 4-way plug 320 with these four connections: (1) for a left turn signal 302 (also used for braking); (2) for a right turn signal 304 (also used for braking); (3) for tail lights 306 (also for marker lights); and, (4) a ground wire 308. It should be understood that the trailer plugs 202 just described are exemplary only as many variations are possible.

Figure 4:
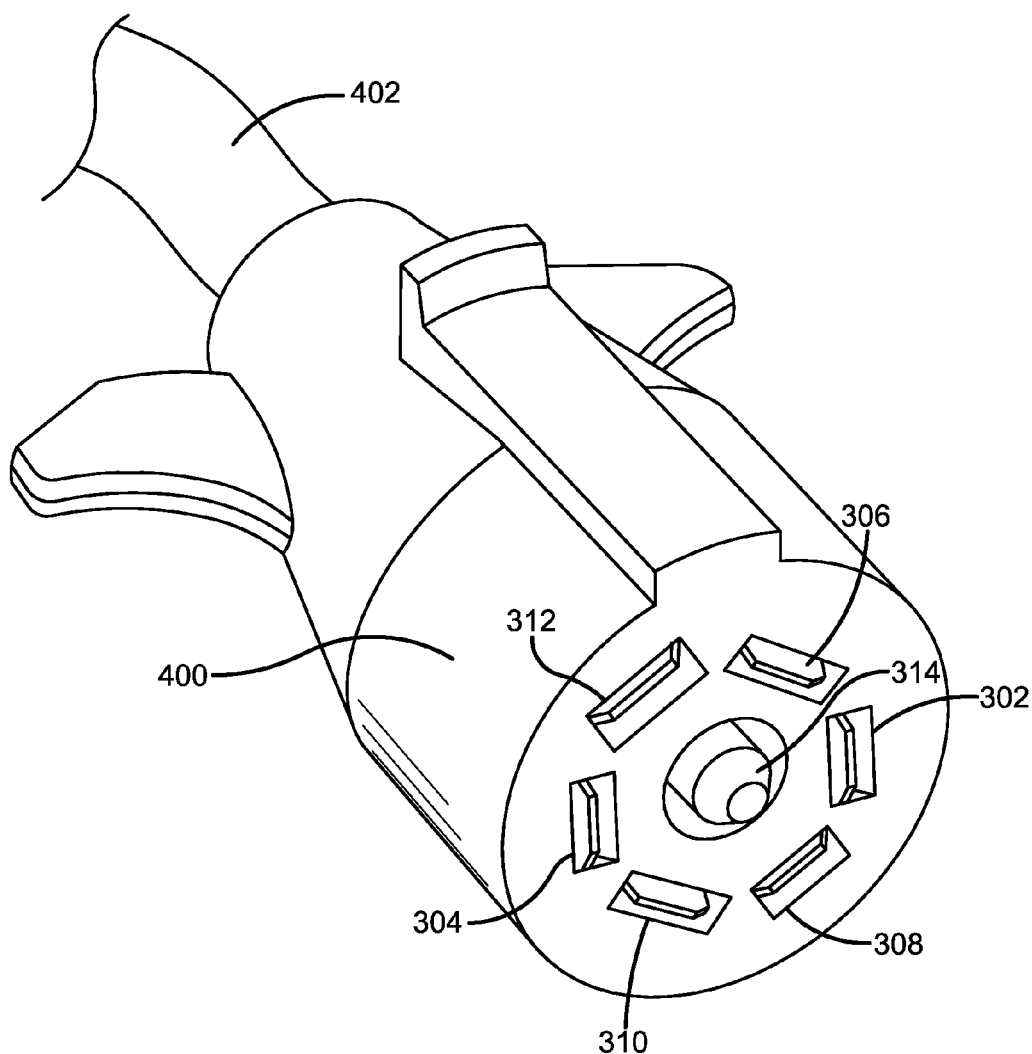
FIG. 4 is a perspective view of an auxiliary plug with the end of a wire bundle visible.
Figure 11:
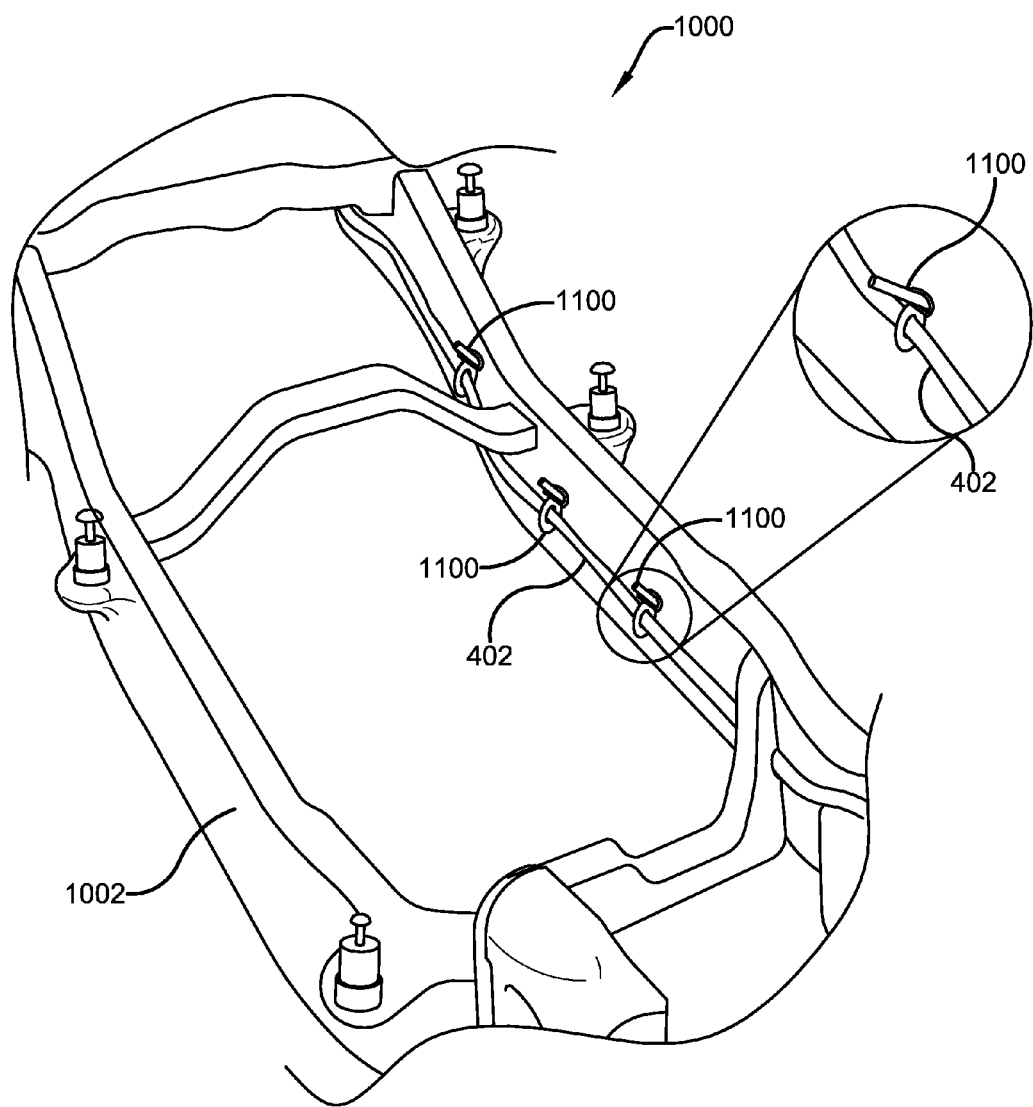

With reference now to FIGS. 4 and 11, according to some embodiments of this invention, a wire bundle 402 is used to connect the trailer plug 202 to the auxiliary lighting system 114. One end of the wire bundle 402 may have an auxiliary plug 400 that is suitable to electrically connect to (plug into) the particular trailer plug 202. FIG. 4 shows one embodiment auxiliary plug 400 that is suitable to plug into the 7-way trailer plug 300 shown in FIG. 3A. The same reference numbers are used in FIG. 4 as in FIG. 3A to indicate the correlating interconnections. Thus, for example, the auxiliary plug 400 connections are: (1) 302 to match or connect to connection 302 of the trailer plug 300; (2) 304 to match or connect to connection 304 of the trailer plug 300; (3) 306 to match or connect to connection 306 of the trailer plug 300; (4) 308 to match or connect to connection 308 of the trailer plug 300; (5) 310 to match or connect to connection 310 of the trailer plug 300; (6) 312 to match or connect to connection 312 of the trailer plug 300; and, (7) 314 to match or connect to connection 314 of the trailer plug 300. Similarly, in other embodiments, the auxiliary plug 400 can be formed to electrically connect to (plug into): trailer plug 316 in FIG. 3B; trailer plug 318 in FIG. 3C; and, trailer plug 320 in FIG. 3D. The auxiliary plug 400 can be formed to electrically connect to (plug into) any trailer plug chosen with the sound judgment of a person of skill in the art.

With reference now to FIGS. 4, 6 and 10-11, the opposite end of the wire bundle 402 may electrically connect to (plug into) a controller 600. Alternatively, the opposite end of the wire bundle 402 may connect to another component(s) that connects to the controller 600. The operation of the controller 600 will be discussed further below. The wire bundle 402 may be secured to the vehicle in any manner chosen with the sound judgment of a person of skill in the art. According to one embodiment, the wire bundle 402 is secured under the chassis 1000 of the vehicle and runs lengthwise from the rear of the vehicle to the front of the vehicle where it can terminate at or near the snowplow assembly 102. According to another embodiment, the wire bundle 402 can terminate at the front of the vehicle whereby a second connection could be made with the snowplow assembly 102 wiring system. The wire bundle can be secured to the chassis 1000 using zip-ties 1100, twist ties, wires, or any other fastener chosen by the sound judgment of a person of ordinary skill in the art. According to another embodiment, conduit can be mounted to the chassis 1000 using zip-ties 1100 or other fasteners. The wire bundle 402 can be routed through the conduit from the rear of the vehicle to the front of the vehicle. According to another embodiment, the wire bundle 402 can be routed through the interior of the vehicle's frame 1002.

Figure 5:
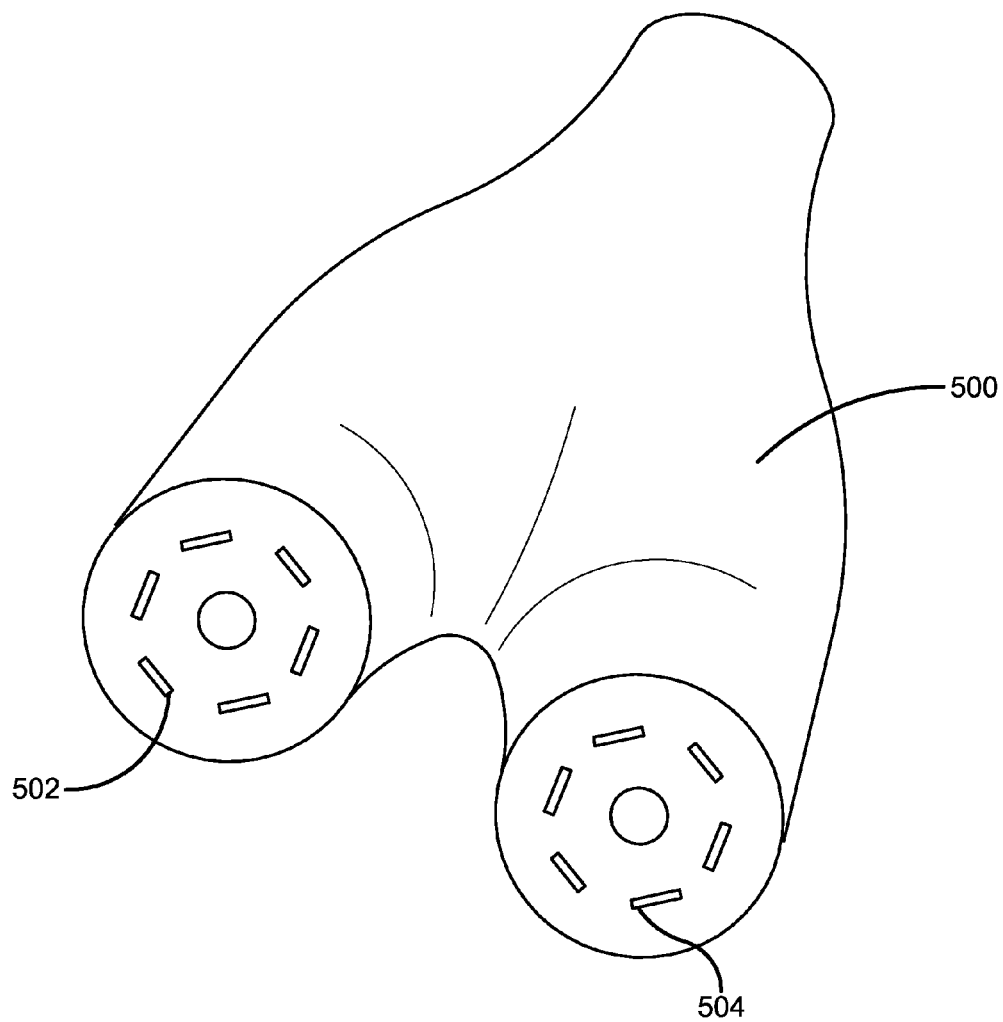
FIG. 5 is perspective view of one embodiment of a pigtail adapter.

With reference to FIG. 5, a pigtail adapter 500 can be used between the trailer plug 202 and the auxiliary plug 400. The pigtail adapter 500 can split the connections from the trailer plug 200 into a first outlet 502 and a second outlet 504. The first and second outlets 502, 504 can be configured to allow connections for any of the various plug types. By way of a non-limiting example, the first outlet 502 can be a 7-way plug 300 while the second outlet 504 can be a 4-way plug 320. The combinations can be chosen by a person of ordinary skill in the art and can be tailored for specific needs given the desired usage. The pigtail adapter 500 can allow a person to connect the present invention while leaving an additional connection available for use with a trailer or second implement 100. According to one embodiment, the pigtail adapter 500 can have more than two outlets.

With reference now to FIGS. 2, 3A, 3B, 3C, 3D, 8 and 8A, in other embodiments of this invention, instead of a wire bundle, a transponder 800 may be electrically connected to and physically supported to the trailer plug 202. In one specific embodiment, the transponder 800 can include a transponder plug 802 which plugs into the trailer plug. The specific transponder plug 802 used may be configured to connect to the particular trailer plug 202 type mounted to the vehicle. According to one embodiment, the transponder plug 802 can be configured to align with the 7-way plug 300. According to other embodiments, the transponder plug 802 can be configured to connect to a 6-way plug 316, a 5-way plug 318, or a 4-way plug 320.

Figure 8:
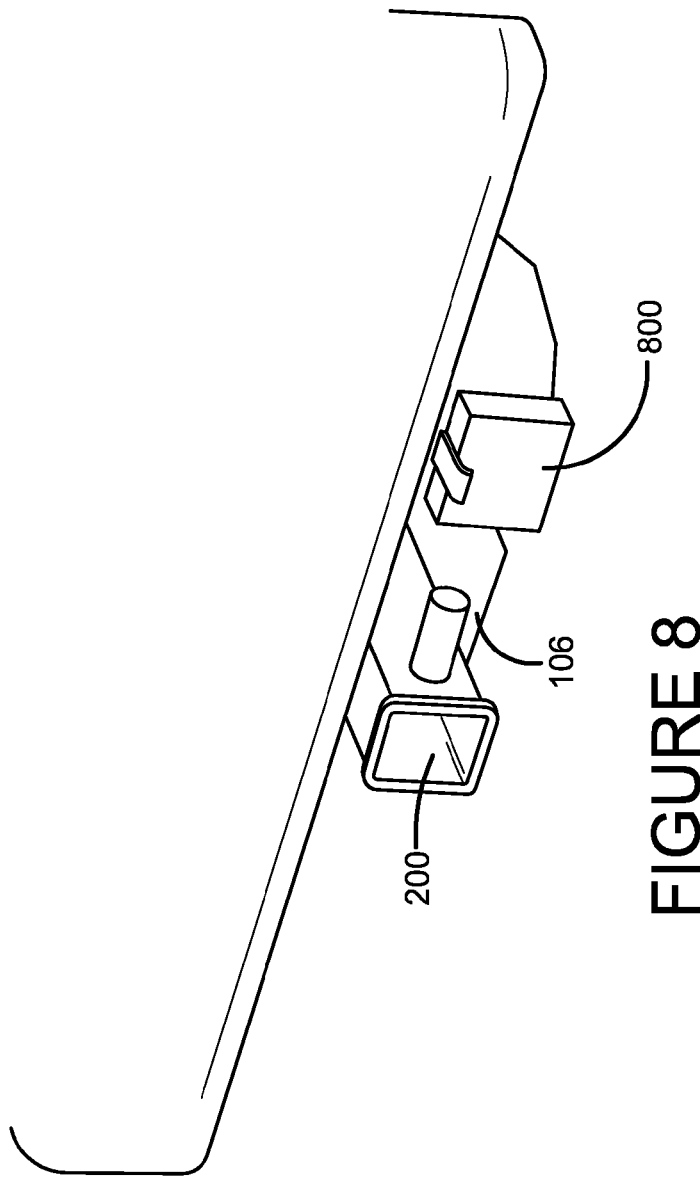
FIG. 8 is a perspective view of the rear of a vehicle, showing a transponder connected to a trailer plug.
Figure 8A:
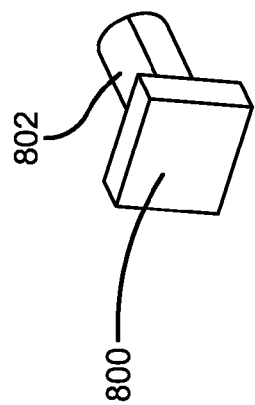
FIG. 8A is a perspective view of a transponder.
Figure 9:
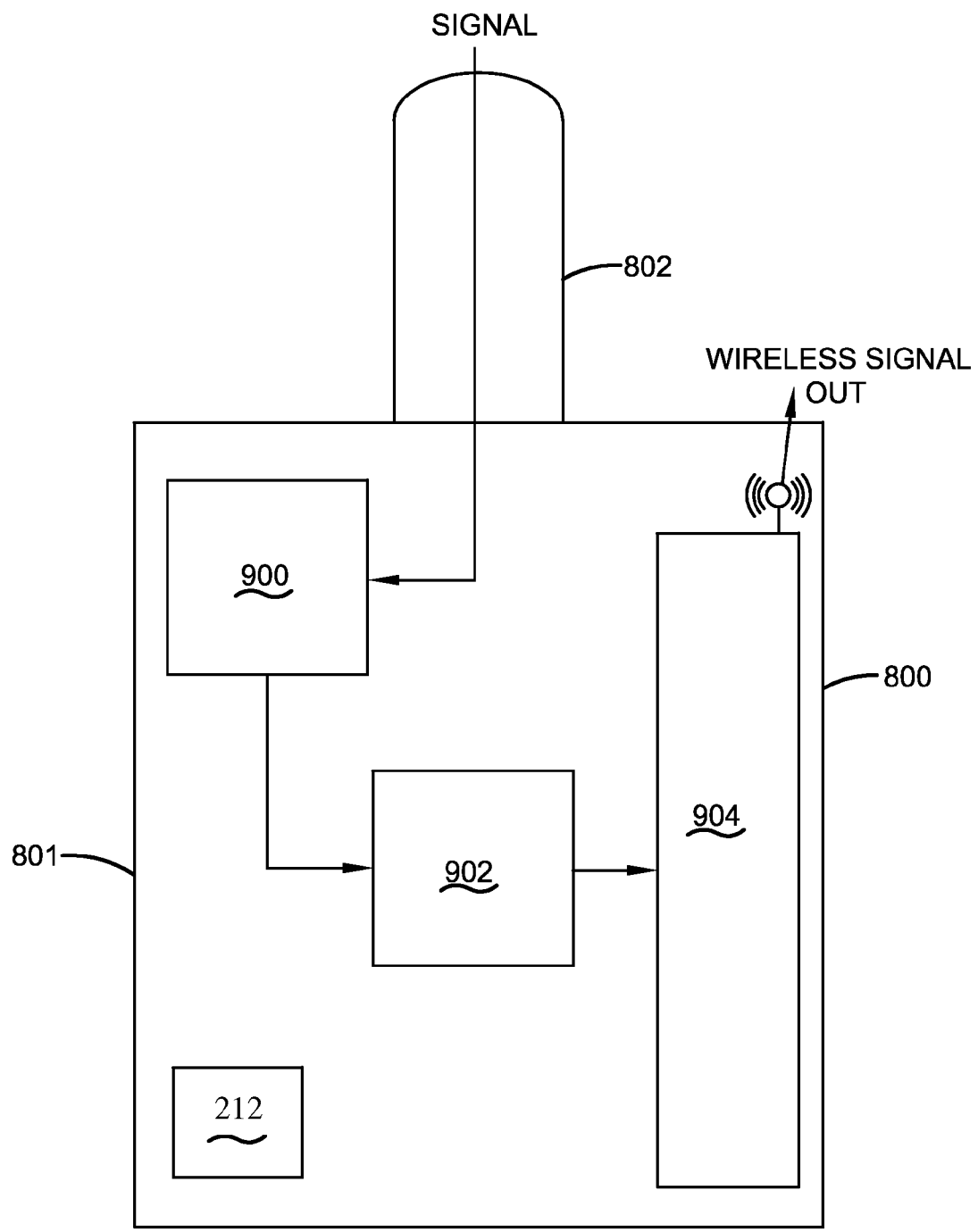
FIG. 9 is a schematic representation of the transponder.
Figure 10:
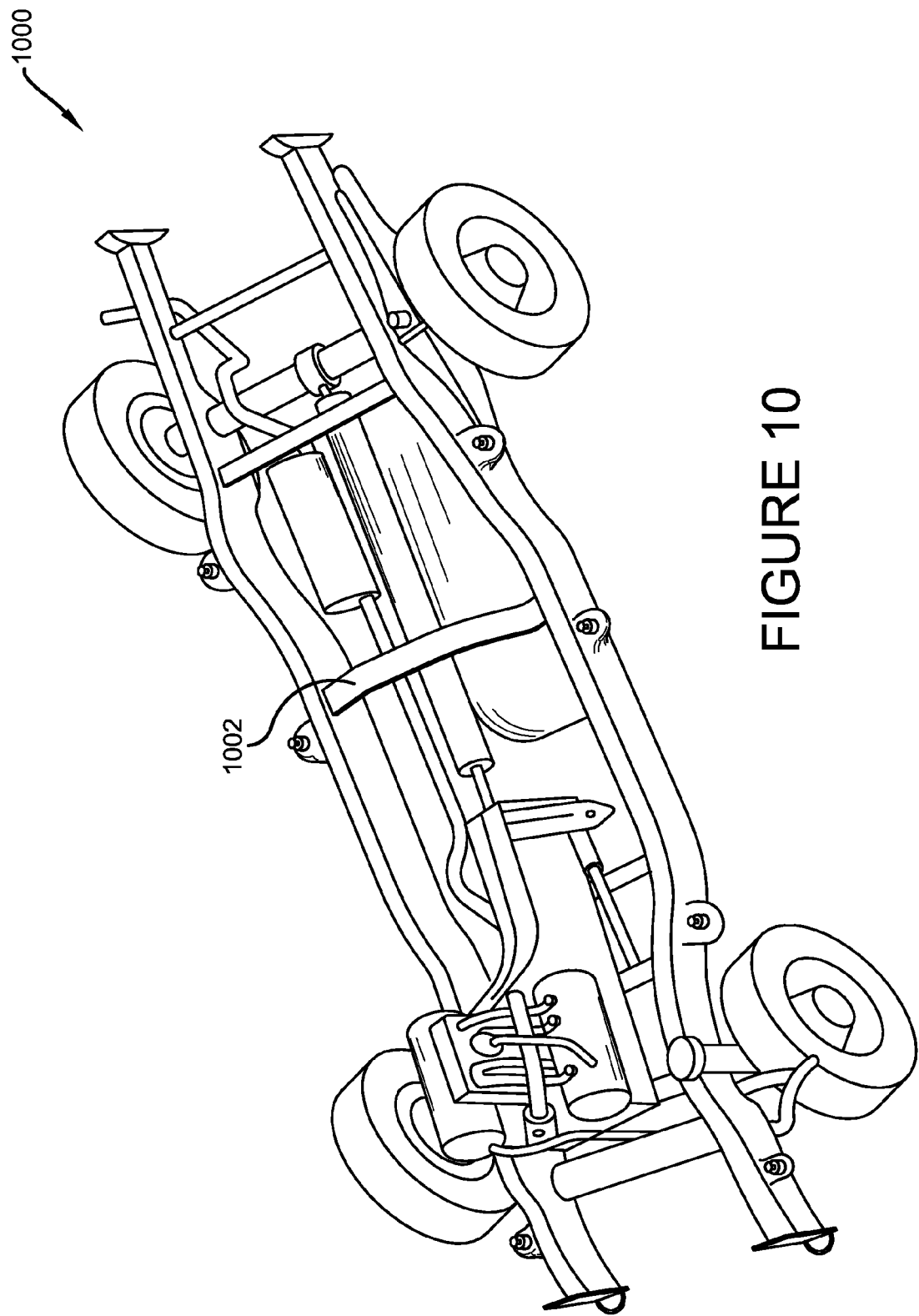
FIG. 10 is a perspective view of an embodiment of a vehicle chassis with the vehicle body removed; and, FIG. 11 is a detailed view of a portion of a vehicle chassis showing the wire bundle attachment means.

With reference now to FIGS. 2, 8A and 9, in some embodiments, the transponder 800 can include a housing 801 to which the transponder plug 802 is supported. The transponder 800 can also include several circuits that can perform one or more functions. The transponder 800 can, for example, include a receiving unit 900 which is supported to the housing 801 and which receives incoming signals from the vehicle via the trailer plug 202. The receiver then directs the signal to the processing unit 902 which is also supported to the housing 801. The processing unit 902 can interpret the signal it receives to determine the appropriate signal it should send to the communication unit 904. The communication unit 904 may also be supported to the housing 801 and may transmit a corresponding wireless signal. The wireless signal can be radio frequency, WiFi, Bluetooth, or any other wireless transmission protocol capable of being broadcast over a wide enough distance to reliably reach the desired end point to control and/or power the auxiliary lighting system 114. In one embodiment, the transponder 800 can draw power directly from the vehicle's power supply via the trailer plug 202, such as auxiliary power connection 312. In another embodiment, the transponder 800 may be powered directly by an independent power source 212 such as a battery which may be supported to the housing 801. According to an embodiment, the transponder 800 can be mounted to and supported by the hitch receiver 200. According to another embodiment, the transponder 800 can be mounted on and supported to the vehicle. In some embodiments the transponder 800 cannot transfer power to the auxiliary light system 114 so another source of power may need to be supplied to the auxiliary light system 114. In one embodiment, the auxiliary light system 114 is powered by the vehicle's battery 12. In this case, appropriate wiring will have to be provided between the battery 12 and the auxiliary light system 114. In another embodiment, the auxiliary light system 114 may be powered by a separate power source 450 (which may be a battery) that is part of the auxiliary implement 100.

With reference now to FIGS. 1, 1A, 6 and 7, the auxiliary lighting system 114 may include a controller 600. Controller 600 may, in one embodiment, be a controller that controls not only the auxiliary lighting system 114, but also one or more other portions of the auxiliary implement 100. In another embodiment, the controller 600 may control only the auxiliary lighting system 114. Controller 600 may be mounted on the snowplow assembly 102. According to alternative embodiments, the controller 600 can be mounted within the housing of an auxiliary light 104, or on the vehicle, or within the engine compartment of the vehicle.

Figure 6:
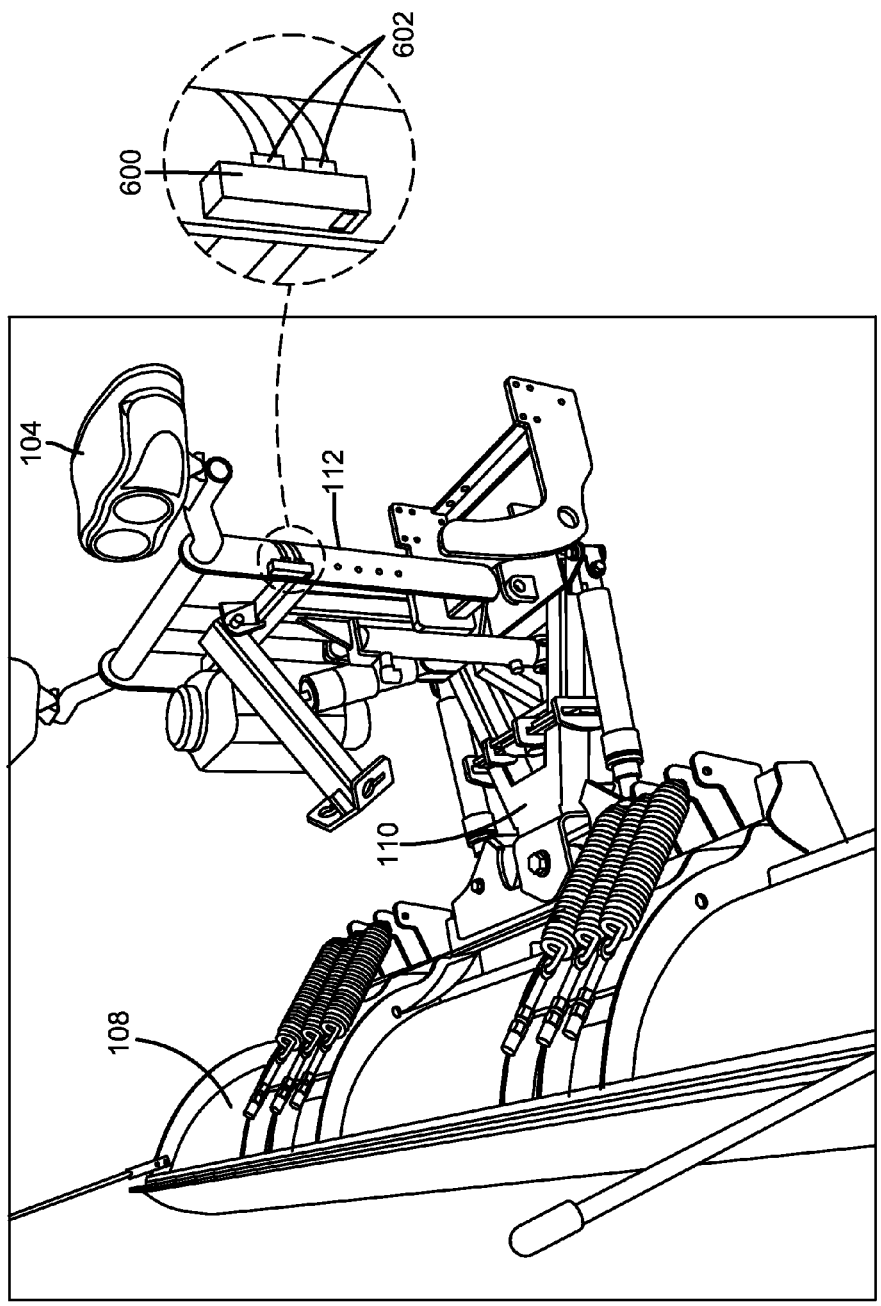
FIG. 6 is a perspective view of a plow frame with a controller.
Figure 7:
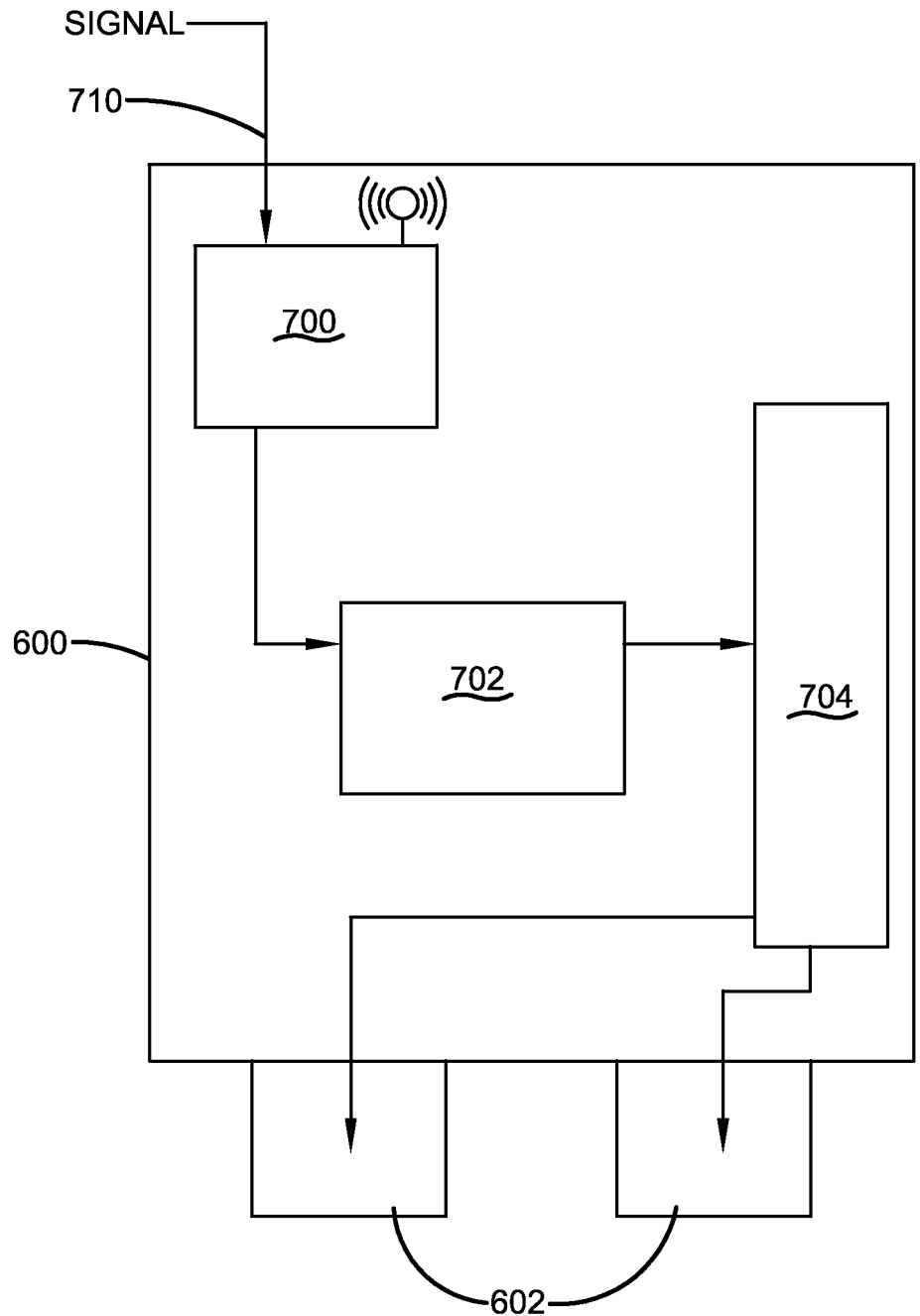
FIG. 7 is a schematic representation of a controller.

With continuing reference to FIGS. 6 and 7, the controller 600 may include several circuits that can perform one or more functions. The controller 600 may include a receiver 700 which receives incoming signals 710. In one embodiment, the signals 710 are sent by wires such as from the wire bundle 402. In another embodiment, the incoming signals 710 a are sent wirelessly (through radio frequency, WiFi, Bluetooth, or any other wireless transmission protocol) such as by the transponder 800. The receiver 700 then directs a corresponding signal to the microprocessor 702 which may be programmed to provide appropriate output(s) that may be directed to a power distribution circuit 704 which then sends the appropriate signals to the auxiliary lighting system 114. In one embodiment, the controller 600 may have one or more ports 602 to connect to the auxiliary lighting system 114.

With reference now to FIGS. 1, 1A and 7, some non-limiting embodiments of how the microprocessor 702 may be programmed to be used with the auxiliary lighting system 114 will now be described. If the trailer plug 202 includes a connection 308 for ground, this signal could be used for grounding purposes as is well known to those of skill in the art. The connections 302 and 304 for left and right turn signals can be used to control left and right turn signal lights on the auxiliary lighting system 114 similar to such lights that might be on a trailer and on the vehicle. If the trailer plug 202 includes a connection 312 for auxiliary power, this connection could be used to power any component in any manner chosen by a person of skill in the art. Such a component may be an auxiliary lighting system 114 component and/or an auxiliary implement 100 component. Any trailer plug connection that is not desired to be used can be repurposed or terminated, as determined by one of ordinary skill in the art. The connection 310 for trailer power brakes, for example, could be terminated.

With reference now to FIGS. 1, 1A and 7, the connections 302 and 304 can also be used for indicating that the vehicle operator has activated the vehicle brakes as noted above. The connection 310 could also be used for this purpose. This braking signal could be used with the auxiliary lighting system 114 in a number of different ways. In one embodiment, one or more lights on the auxiliary lighting system 114 could be illuminated continuously for the duration of the braking event. In another embodiment, left and right turn signal lights on the auxiliary lighting system 114 could be controlled to flash on and off for the duration of the braking event. These embodiments may be used to indicate to observers in front of the vehicle that the vehicle is slowing and/or that they should exercise caution. The brake signal could also, in some embodiments, be used with respect to the auxiliary implement 100. In one non-limiting example, the brake signal could be used to adjust the position of the snowplow assembly 102. The connection 314 for reverse lights could also be used to illuminate lights on the auxiliary lighting system 114 or could be terminated.

With reference now to FIGS. 1, 1A and 7, the trailer plug connections can also be used to control auxiliary headlights in any manner chosen with the sound judgment of a person of skill in the art. In one non-limiting example, it is common for vehicle light controls to be adjustable between: (1) an "off" or no power condition; (2) park or running lights "on" condition; (3) headlights "on" condition; and, (4) headlight high beams "on" condition. When the vehicle lights are in the off condition, no power goes to the vehicle head lights or high beams or to the vehicle's tail lights. In this case, connection 306 for tail lights would not be powered and the microprocessor 702 may be programmed to use this signal as an indication to provide no power to the auxiliary headlights—thus an "off" condition for the auxiliary headlights to match the vehicle headlights. When the vehicle lights are in any of the on conditions (whether park or running lights on, or headlights on, or high beams on), connection 306 for tail lights would be powered (an "on" condition) and the microprocessor 702 may be programmed to use this signal as an indication to provide power to the auxiliary headlights—thus an "on" condition for the auxiliary headlights. Whenever the auxiliary lighting system 114 is attached to the vehicle, the vehicle operator may treat all "headlight on" conditions (conditions 2, 3 and 4 discussed above) the same; namely, manually adjusting the vehicle light controls to be in the park or running lights "on" condition. In this way, neither the vehicle headlights nor the vehicle high beams will be "on" and thus will not reflect off of the auxiliary implement 100 back to the vehicle thereby interfering with the operator's vision.

With reference now to FIG. 1, in some embodiments a signal is communicated from the trailer plug 202 through the wire bundle 402 and eventually to the microprocessor 702. In other embodiments described above, a signal is communicated from the trailer plug 202 through the transponder 800 then wirelessly from the transponder and eventually to the microprocessor 702. As is well known to those of skill in the art, a microprocessor operates based on the signal it receives from an input. As explained above, the signal that reaches the microprocessor 702 may come from a component intermediate the signal from the wire bundle 402 or transponder 800—such as from the receiver 700. Additional and/or alternative intermediate components may also be used in other embodiments. For clarity, the expression "directly or indirectly" may be used in this patent with regard to signals (whether wired or wireless). It is to be understood that "directly" means a signal that travels directly from one component to a second component and indirectly" means a signal that travels from one component to a second component but with one or more intermediate components also used. Thus, for example, a signal that travels from wire bundle 402 to microprocessor 702 with no intermediate components would be a direct signal. In this case, the microprocessor's operation may be said to be based directly on the signal. In another example, a signal that travels from wire bundle 402 to microprocessor 702 with one or more intermediate components (such as receiver 700) would be an indirect signal. In this case, the microprocessor's operation may be said to be based indirectly on the signal—regardless of what and how many intermediate components may be used. As another example, a wireless signal that travels from transponder 800 to microprocessor 702 with no intermediate components would be a direct signal. In this case, the microprocessor's operation may be said to be based directly on the wireless signal. In yet another example, a wireless signal that travels from transponder 800 to microprocessor 702 with one or more intermediate components (such as receiver 700) would be an indirect wireless signal. In this case, the microprocessor's operation may be said to be based indirectly on the wireless signal—regardless of what and how many intermediate components may be used.

With reference now to FIGS. 1 and 1A, to use this invention in some embodiments, the operator may first acquire the proper wire bundle 402 to match the vehicle's trailer plug 202 and the auxiliary lighting system 114 including the controller 600. The operator may then attach the wire bundle 402 to the vehicle—embodiments of this attachment are described above. The operator may then electrically connect one end of the wire bundle 402, which may include the auxiliary plug 400, into the trailer plug 202. The operator may then connect the opposite end to the controller 600 or to another component which is ultimately connected to the controller 600. This may complete the attachment. In use, the operator may simply adjust the vehicle lights, typically using vehicle light controls within the vehicle, to match the atmospheric light condition. If the atmospheric light condition is relatively lighter, there may be no need to turn on the vehicle lights. As a result, the trailer plug 202 may indicate that no tail lights are required. The microprocessor 702 may use that indication to keep the auxiliary headlight(s) in an off condition. If the atmospheric light condition is relatively darker, there may be a need for the operator to turn on the vehicle lights. As a result of the operator turning on the vehicle lights, the trailer plug 202 may indicate that tail lights are required. The microprocessor 702 may use that indication to place the auxiliary headlight(s) in an on condition. Turn signals, if applicable, may be used as described above. Similarly, a brake signal, if applicable, may be used as described above.

With reference now to FIGS. 1 and 1A, to use this invention in some embodiments, the operator may first acquire the proper transponder 800 to match the vehicle's trailer plug 202 and the auxiliary lighting system 114 including the controller 600. The operator may then attach the transponder 800 to the vehicle—embodiments of this attachment are described above. The operator may then electrically connect the transponder 800 to the trailer plug 202. Embodiments for this connection are described above. This may complete the attachment. In use, the operator may simply adjust the vehicle lights, typically using vehicle light controls within the vehicle, to match the atmospheric light condition. If the atmospheric light condition is relatively lighter, there may be no need to turn on the vehicle lights. As a result, the trailer plug 202 may indicate that no tail lights are required. The microprocessor 702 may use that indication to keep the auxiliary headlight(s) in an off condition. If the atmospheric light condition is relatively darker, there may be a need for the operator to turn on the vehicle lights. As a result of the operator turning on the vehicle lights, the trailer plug 202 may indicate that tail lights are required. The microprocessor 702 may use that indication to place the auxiliary headlight(s) in an on condition. Turn signals, if applicable, may be used as described above. Similarly, a brake signal, if applicable, may be used as described above.

As described above, the present disclosure has been described with preferred embodiments thereof and it is understood that many changes and modifications to the described embodiments can be carried out without departing from the scope and the spirit of the present disclosure that is intended to be limited only by the appended claims.

Having thus described the invention, it is now claimed:

1. An auxiliary apparatus for use with an associated vehicle having a front, first and second sides, a back, and a trailer plug positioned at the back of the associated vehicle, the auxiliary apparatus comprising:
   (A) an auxiliary implement that is removably mountable to at least one of: (1) the associated vehicle's front; and, (2) at least one of the associated vehicle's sides;
   (B) an auxiliary lighting system for use with the auxiliary implement including at least one auxiliary light;
   (C) a wire bundle that: (1) has a first end that is electrically hardwire connectable to the trailer plug; (2) has a second end that is electrically hardwire connectable to at least one of the auxiliary lighting system and a controller; and, (3) transmits an electrical signal from the trailer plug to the second end; and,
   (D) wherein the controller: (1) is electrically connectable to at least one of the wire bundle and the auxiliary lighting system; and, (2) comprises a microprocessor programmed to operate the at least one auxiliary light based directly or indirectly on the electrical signal.

2. The auxiliary apparatus of claim 1 wherein:
the wire bundle is securable to the associated vehicle to run lengthwise from the back of the vehicle to the front of the vehicle.

3. The auxiliary apparatus of claim 1 wherein:
the associated vehicle comprises at least one tail light;
the at least one auxiliary light comprises an auxiliary headlight; and,
the controller operates the auxiliary headlight into: (1) an on condition when the associated trailer plug indicates that the associated vehicle's at least one tail light is in an on condition; and, (2) an off condition when the associated trailer plug indicates that the associated vehicle's at least one tail light is in an off condition.

4. The auxiliary apparatus of claim 1 wherein:
the associated vehicle comprises at least one blinker light;
the at least one auxiliary light is an auxiliary blinker light; and,
the controller operates the auxiliary blinker light into: (1) a blinking condition when the associated trailer plug indicates that the associated vehicle's at least one blinker light is in a blinking condition; and, (2) an off condition when the associated trailer plug indicates that the associated vehicle's blinker light is in an off condition.

5. The auxiliary apparatus of claim 1 wherein:
the auxiliary implement is a snowplow assembly.

6. The auxiliary apparatus of claim 1 wherein:
the first end of the wire bundle comprises an auxiliary plug that is electrically connectable to the trailer plug.

7. The auxiliary apparatus of claim 6 further comprising:
a pigtail adapter that is electrically connectable to the trailer plug and that has first and second outlets; and,
wherein at least one of the first and second outlets is electrically connectable to the auxiliary plug.

8. The auxiliary apparatus of claim 1 wherein:
the controller comprises a receiver that receives the electrical signal.

9. The auxiliary apparatus of claim 1 wherein:
the controller comprises at least one port for use in connecting to the auxiliary lighting system.

10. An auxiliary lighting system method for use with an associated vehicle having a front, first and second sides, a back, and a trailer plug positioned at the back of the associated vehicle, the method comprising the steps of:
   (A) providing an auxiliary implement;
   (B) providing an auxiliary lighting system for use with the auxiliary implement that includes at least one auxiliary light;
   (C) providing a wire bundle;
   (D) providing a controller comprising a microprocessor; and,
   (E) designing the auxiliary implement, the wire bundle and the controller to be operable according to the following steps:
      (1) mounting the auxiliary implement to at least one of: (a) the associated vehicle's front; and, (b) at least one of the associated vehicle's sides;
      (2) mounting the auxiliary lighting system to at least one of the associated vehicle and the auxiliary implement;
      (3) mounting the controller to at least one of: (a) the associated vehicle's front; (b) at least one of the associated vehicle's sides; (c) the auxiliary implement; and, (d) the auxiliary lighting system;
      (4) electrically hardwire connecting a first end of the wire bundle to the trailer plug;
      (5) electrically hardwire connecting a second end of the wire bundle to at least one of the auxiliary lighting system and the controller;
      (6) electrically connecting the controller to at least one of the wire bundle and the auxiliary lighting system;
      (7) transmitting an electrical signal from the trailer plug through the wire bundle to the second end of the wire bundle; and,
      (8) using the controller to operate the at least one auxiliary light based directly or indirectly on the electrical signal.

11. The auxiliary lighting system method of claim 10 wherein step (E)(5) comprises the steps of:

extending the wire bundle from the back of the associated vehicle to the front of the associated vehicle; and, securing the wire bundle to the associated vehicle.

12. The auxiliary lighting system method of claim 10 wherein:

the associated vehicle comprises at least one tail light;

step (B) comprises the step of providing the at least one auxiliary light to comprise an auxiliary headlight;

step (E)(8) comprises the step of: operating the auxiliary headlight into: (1) an on condition when the associated trailer plug indicates that the associated vehicle's at least one tail light is in an on condition; and, (2) an off condition when the associated trailer plug indicates that the associated vehicle's at least one tail light is in an off condition.

13. The auxiliary lighting system method of claim 10 wherein:

the associated vehicle comprises at least one blinker light;

step (B) comprises the step of providing the at least one auxiliary light to comprise an auxiliary blinker light; and, step (E)(8) comprises the step of: operating the auxiliary blinker light into: (1) a blinking condition when the associated trailer plug indicates that the associated vehicle's at least one blinker light is in a blinking condition; and, (2) an off condition when the associated trailer plug indicates that the associated vehicle's at least one blinker light is in an off condition.

14. The auxiliary lighting system method of claim 10 wherein:

step (A) comprises the step of: providing the auxiliary implement to be a snowplow assembly.

15. An auxiliary lighting system for use with: (1) an associated vehicle having a front, first and second sides, a back, and a trailer plug positioned at the back of the associated vehicle; and, (2) an associated auxiliary snowplow assembly mountable to the associated vehicle and comprising a plow blade positioned substantially at the front of the associated vehicle; the auxiliary lighting system comprising:

(A) at least one auxiliary light;

(B) a wire bundle that: (1) has a first end that is electrically hardwire connectable to the trailer plug; (2) has a second end that is electrically hardwire connectable to at least one of the auxiliary lighting system and a controller; and, (3) transmits an electrical signal from the trailer plug to the second end; and, (C) wherein the controller: (1) is electrically connectable to at least one of the wire bundle and the auxiliary lighting system; and, (2) comprises a microprocessor programmed to operate the at least one auxiliary light based directly or indirectly on the electrical signal.

16. The auxiliary lighting system of claim 15 wherein:

the wire bundle is securable to the associated vehicle to run lengthwise from the back of the vehicle to the front of the vehicle.

17. The auxiliary lighting system of claim 15 wherein:

the associated vehicle comprises at least one tail light;

the at least one auxiliary light comprises an auxiliary headlight; and, the controller operates the auxiliary headlight into: (1) an on condition when the associated trailer plug indicates that the associated vehicle's at least one tail light is in an on condition; and, (2) an off condition when the associated trailer plug indicates that the associated vehicle's at least one tail light is in an off condition.

18. The auxiliary lighting system of claim 15 wherein:

the associated vehicle comprises at least one blinker light;

the at least one auxiliary light is an auxiliary blinker light; and, the controller operates the auxiliary blinker light into: (1) a blinking condition when the associated trailer plug indicates that the associated vehicle's at least one blinker light is in a blinking condition; and, (2) an off condition when the associated trailer plug indicates that the associated vehicle's blinker light is in an off condition.

19. The auxiliary lighting system of claim 15 wherein:

the controller comprises a receiver that receives the electrical signal.

20. The auxiliary lighting system of claim 15 wherein:

the controller comprises at least one port for use in connecting to the auxiliary lighting system.

\* \* \* \* \*